United States Patent
Jia et al.

(10) Patent No.: US 11,245,970 B1
(45) Date of Patent: Feb. 8, 2022

(54) REDUNDANCY ARCHITECTURES AND LINKS

(71) Applicant: CABLE TELEVISION LABORATORIES, INC., Louisville, CO (US)

(72) Inventors: Zhensheng Jia, Superior, CO (US); Junwen Zhang, Broomfield, CO (US); Mu Xu, Broomfield, CO (US); Haipeng Zhang, Broomfield, CO (US); Luis Alberto Campos, Superior, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 17/149,589

(22) Filed: Jan. 14, 2021

Related U.S. Application Data

(60) Provisional application No. 62/960,893, filed on Jan. 14, 2020.

(51) Int. Cl.
   *H04B 10/032* (2013.01)
   *H04Q 11/00* (2006.01)

(52) U.S. Cl.
   CPC ....... *H04Q 11/0005* (2013.01); *H04B 10/032* (2013.01); *H04Q 2011/0043* (2013.01)

(58) Field of Classification Search
   CPC .................................................. H04B 10/032
   See application file for complete search history.

(56) References Cited

U.S. PATENT DOCUMENTS

| | | | | |
|---|---|---|---|---|
| 7,099,578 B1* | 8/2006 | Gerstel | ............... | H04J 14/0295 370/216 |
| 7,561,799 B2* | 7/2009 | Togawa | ............... | G02B 6/3562 385/16 |
| 2005/0213178 A1* | 9/2005 | Sakai | .................. | G02B 6/3588 385/24 |
| 2017/0346549 A1* | 11/2017 | Xie | ....................... | H04J 14/029 |
| 2019/0103934 A1* | 4/2019 | Jones | .................... | H04J 14/021 |

* cited by examiner

*Primary Examiner* — Shi K Li
(74) *Attorney, Agent, or Firm* — Lathrop GPM LLP

(57) ABSTRACT

An optical link redundancy architecture includes an optical switch, an optical coupler, and an optical tap detector. The optical switch including a hub-side switch-port, a normal-mode switch-port, and a failover-mode switch-port. The optical coupler includes (i) a normal-mode coupler-port optically coupled to the normal-mode switch-port via a primary-path optical fiber, and (ii) a failover-mode coupler-port optically coupled to the failover-mode switch-port via a backup-path optical fiber. The optical tap detector (i) is optically coupled to the primary-path optical fiber, (ii) includes a monitor port communicatively coupled to the optical switch, and (iii) outputs a tap signal at the monitor port in response to an optical signal propagating in the primary-path optical fiber. The optical switch optically couples the hub-side switch-port to the failover-mode switch-port when the tap signal is less than a threshold value.

11 Claims, 7 Drawing Sheets

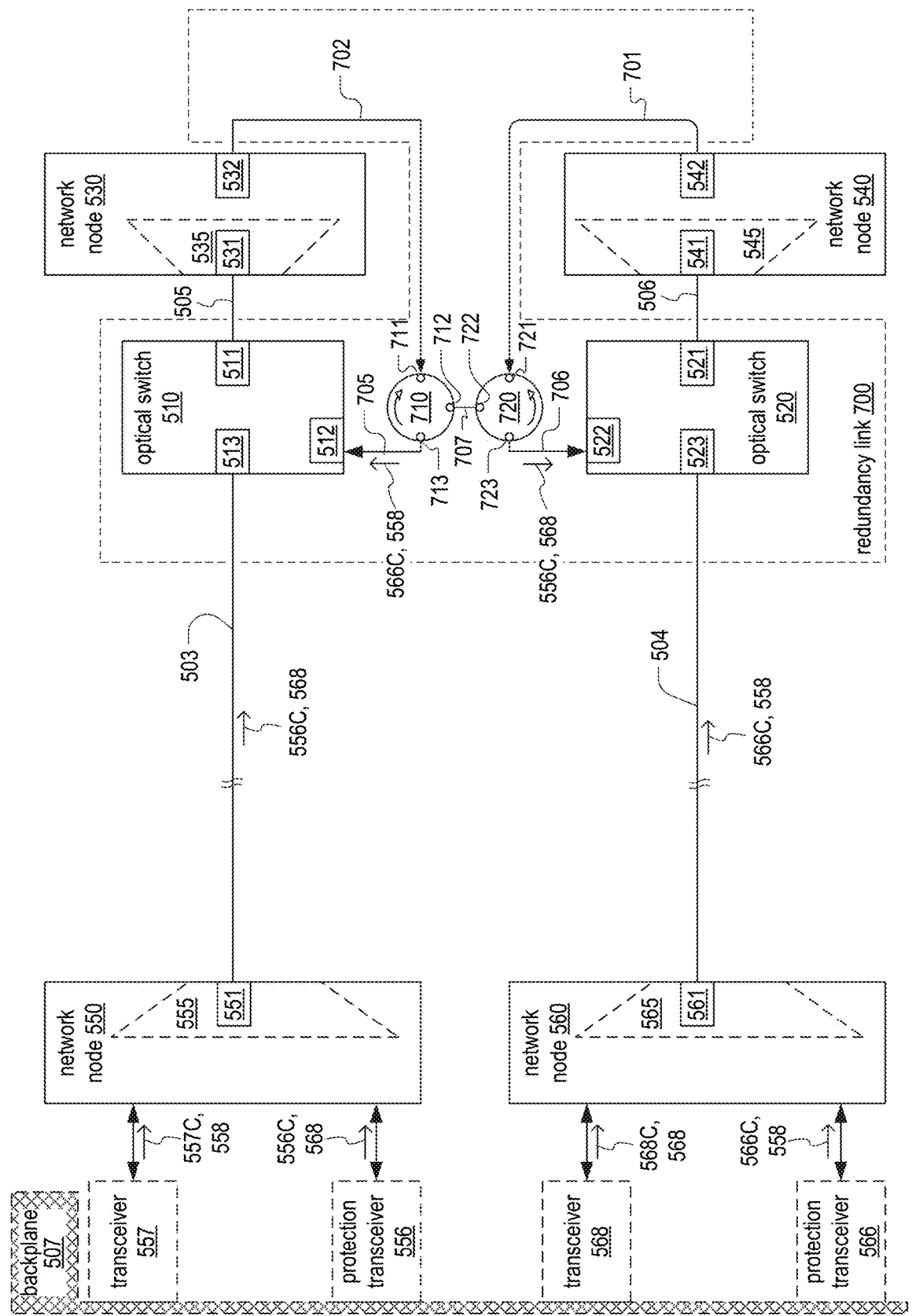

REDUNDANCY ARCHITECTURES AND LINKS

CROSS-REFERENCE TO RELATED APPLICATIONS

This application claims priority to U.S. provisional patent application Ser. No. 62/960,893, filed on Jan. 14, 2020, the disclosure of which is incorporated herein by reference in its entirety.

FIELD OF INVENTION

Embodiments herein pertain to optical networks. More specifically, embodiments herein pertain to implementing failure-redundancy architectures at or near network nodes that serve premise host equipment.

BACKGROUND

Today, cable industry is developing a 10G platform: broadband technology platform that provides 10 Gb/s symmetrical speeds, lower latencies, enhanced reliability, and better security to the end users in a scalable manner. A suite of key advances in cable and optical technologies will enable the 10G platform (10 Gb/s), including deeper fiber penetration, flexible and modular intelligent fiber nodes, spectrum expansion and DOCSIS® 4.0 technologies, all-IP services, and multi-layer network function virtualization.

Cable optical access networks are key components of existing and future telecommunications networks. Yet, cable optical access networks are mostly poorly protected or not protected at all, which means that a single fiber network failure results in data service interruptions for end users, and revenue loss for network providers.

SUMMARY OF THE EMBODIMENTS

Embodiments disclosed herein remedy this vulnerability to network failure with an optical link redundancy architectures and redundancy links.

In a first aspect, an optical link redundancy architecture includes an optical switch, an optical coupler, and an optical tap detector. The optical switch including a hub-side switch-port, a normal-mode switch-port, and a failover-mode switch-port. The optical coupler includes (i) a normal-mode coupler-port optically coupled to the normal-mode switch-port via a primary-path optical fiber, and (ii) a failover-mode coupler-port optically coupled to the failover-mode switch-port via a backup-path optical fiber. The optical tap detector (i) is optically coupled to the primary-path optical fiber, (ii) includes a monitor port communicatively coupled to the optical switch, and (iii) outputs a tap signal at the monitor port in response to an optical signal propagating in the primary-path optical fiber. The optical switch optically couples the hub-side switch-port to the failover-mode switch-port when the tap signal is less than a threshold value.

In a second aspect, a redundancy link includes a first optical switch and a second optical switch. The first optical switch includes a switch-port A1 optically coupled to a multiplexed port M1 of a first network node, a switch-port A2 optically coupled to a demultiplexed port D2 of a second network node, and a switch-port A3 optically coupled to a multiplexed port M3 of a third network node via a first optical fiber. The second optical switch includes a switch-port B1 optically coupled to a multiplexed port M2 of the second network node, a switch-port B2 optically coupled to a demultiplexed port D1 of the first network node, and a switch-port B3 optically coupled to a multiplexed port M4 of a fourth network node via a second optical fiber.

BRIEF DESCRIPTION OF THE FIGURES

FIG. 7 is a schematic of a second redundancy link in an example use scenario within the optical network introduced in FIG. 5, in an embodiment.

DETAILED DESCRIPTION OF THE EMBODIMENTS

Figure 1:
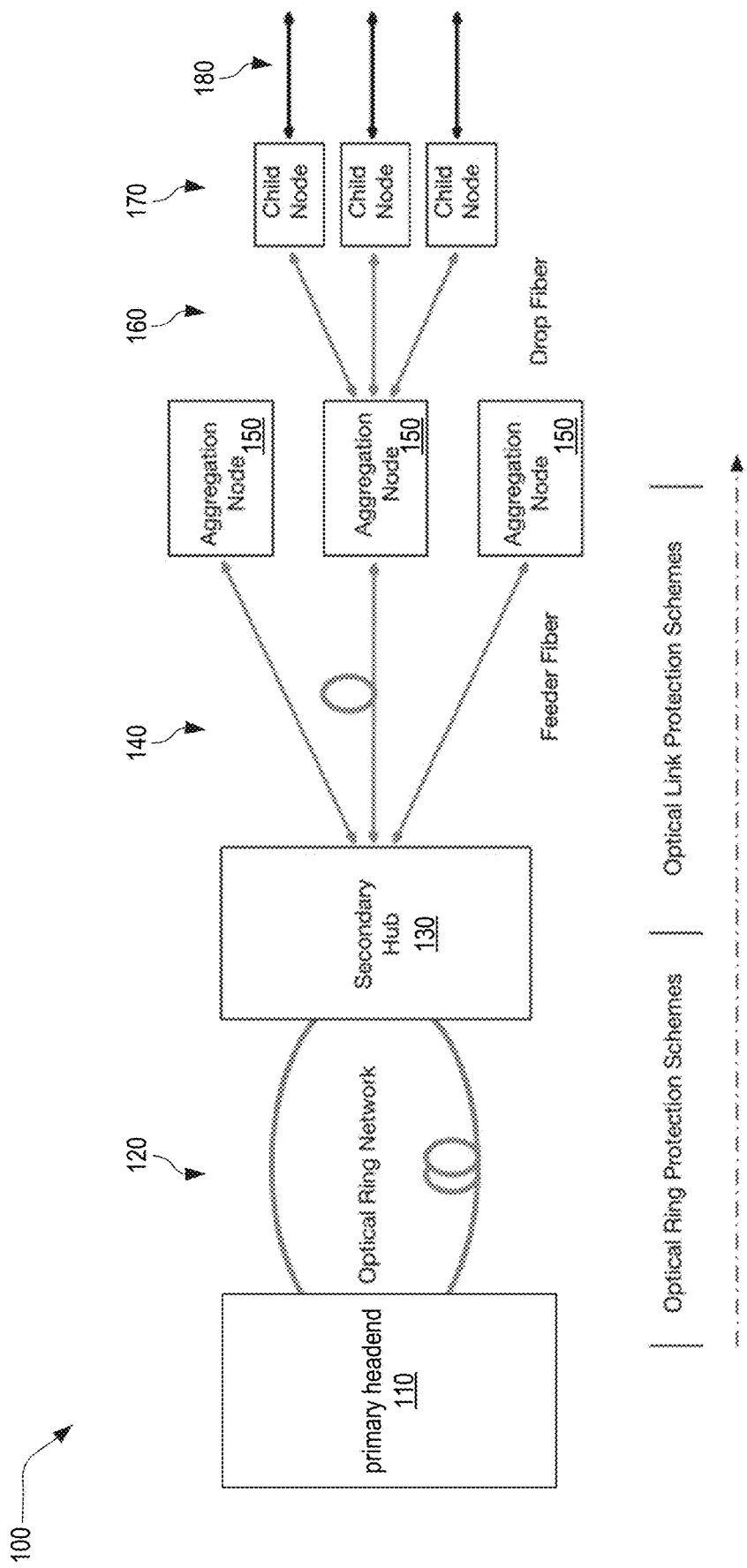
FIG. 1 shows a schematic of a distributed access architecture designed to deliver high-speed data and video to support a variety of services.

FIG. 1 shows a schematic of a distributed access architecture 100 designed to deliver one or both of high-speed data and video to support a variety of services. Distributed access architecture 100 includes a primary headend 110 (depending on the network architecture also known as, for example, a core, head office, primary distribution center, etc.), an optical fiber ring network 120, a secondary hub 130, feeder fibers 140, aggregation nodes 150, drop fibers 160, child nodes 170, and connections 180 (such as coaxial cables, fiber line, twisted pair, and could be a wireless connection such as a directional or non-directional wireless signal). In embodiments, optical fiber ring network 120 is one or more of a mobile network and a cellular network, such as 3G, 4G, 5G, and successor generations, or any cellular network that complies with standards set by the $3^{rd}$ Generation Partnership Project (3GPP). Other embodiments may support communications systems such as ground portions of satellite systems such as geostationary orbit (GEO), medium Earth orbit (MEO), and low Earth orbit (LEO) satellite systems.

In embodiments, primary headend 110 serves as the primary signal/content sources from satellite/microwave antennas, core/metro networks, and due to its central location may also serve as the interconnection points with other service providers. Primary headend 110 is connected to at least one secondary hub 130 via an optical fiber ring network 120. Because of the fundamental shift from centralized architecture to distributed architecture, where analog radio-frequency signals are generated at a Remote PHY Device (RPD) or Remote MAC/PHY Device (RMD) for more Service Groups (SG) with fewer customers each, aggregation nodes 150 are needed for multiple child nodes 170 for residential, business, and cellular backhaul services.

In embodiments, the length of a feeder fiber 140 between secondary hub 130 and an aggregation node 150 is less than at least one of forty kilometers, eighty kilometers, and 150 kilometers. In embodiments, this length of feeder fiber 140 is greater than ten kilometers. In embodiments, the length of a drop fiber 160 between an aggregation node 150 to each child node 170 is at least one of (i) greater than one hundred meters and less than five kilometers.

The available digital options connecting the secondary hub 130, an aggregation node 150, and child nodes 170 are intensity-modulation and direct-detection (IM-DD) technology and coherent optical solutions. In IM-DD case, multiple 10G optical links can be multiplexed by using dense wavelength division multiplexing (DWDM), with aggregation node 150 including an optical multiplexer and an optical demultiplexer. Coherent optics, on the other hand, can significantly increase the spectral efficiency and address the IM-DD limitation on the capacity scaling challenge through enabling a capacity of 100 Gbps or higher on a single wavelength at a much longer transmission distance.

In embodiments, each aggregation node 150 terminates the point-to-point (P2P) coherent optical link that originated at either primary headend 110 or secondary hub 130, and outputs multiple optical or electrical Ethernet interfaces operating at lower data rates (typically 10G) to connect devices that are either co-located with the aggregation node 150 and/or exist deeper in the network. This aggregation or disaggregation function may be done by a router, an Ethernet switch, or a muxponder, depending on the DOCSIS/PON/business traffic demand, cost, scalability/flexibility/reliability, and other operational considerations.

With the optical fiber playing more important role of cable broadband access network and with the transmission rate of fiber channels continuing to improve, a significant loss of data service interruptions will occur once there is a single fiber network failure. Failure of any network component will interrupt the service resulting in a huge loss of revenues. To meet service level agreement (SLA) and provide the appropriate level of access connection availability, fault management, namely preplanned protection and dynamic restoration, within access portion of optical fiber network becomes more significant for reliable service delivery and business continuance. There are many applications where cable optical access network will be desired or necessary depending different availability requirements or the share cost of protection, such as: (a) large number of subscribers per optical line card, (b) fast switchover during network maintenance in avoiding planned maintenance outage, and (c) business and mobile backhaul services, and emergency services (hospitals, police, fire and other safety- and security-related communications).

Normally, the latter two use cases require 5 '9s' (availability 99.999% of the time) or higher SLA and can't afford network outages even for a very short period. Therefore, keeping the communication working is more important. Currently, cable optical access networks are mostly poorly protected or not protected at all. Fiber cuts are not the only issue, Failure may occur in the different optical devices or subsystems and failure rates and time to repair differ widely depending on geography, environment, and optical system design.

Figure 2:
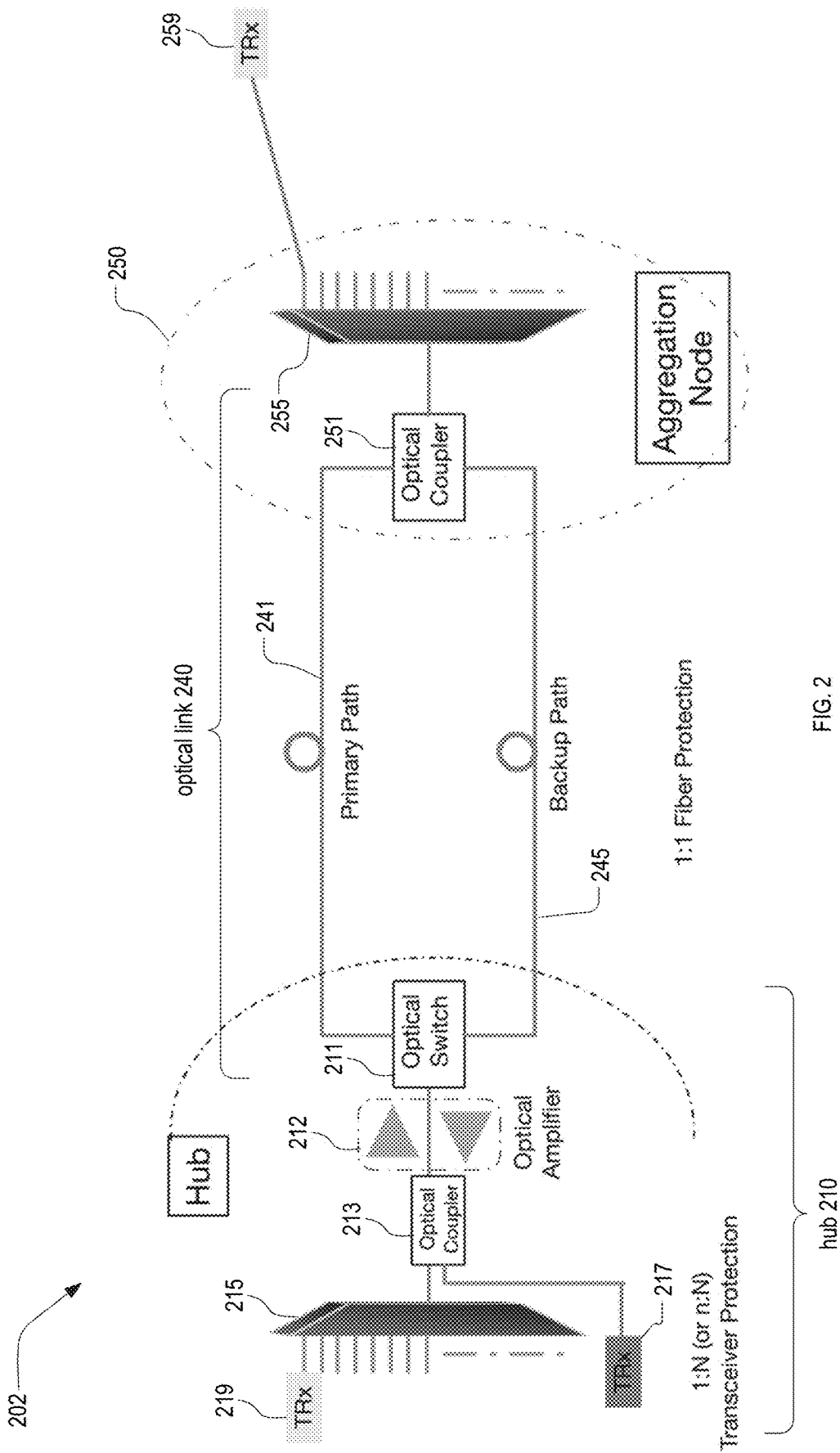
FIG. 2 is a schematic of a section of an optical network.

Embodiments herein describe redundancy architectures are proposed to ensure fiber reliability and resiliency. FIG. 2 is a schematic of an optical network section 202. Optical network section 202 includes hub-side optical transceivers 219, a network hub 210, an optical link 240, an aggregation node 250, and node-side optical transceivers 259. For clarity of illustration, FIG. 2 shows one hub-side optical transceiver 219 and one node-side optical transceiver 259.

Network hub 210 includes an optical switch 211, an optical coupler 213, and a wavelength-selective device 215. Network hub 210 may also include an optical amplifier 212 optically coupled to a node-side port of optical coupler 213 and a hub-side port of optical switch 211. Aggregation node 250 includes an optical coupler 251 and a wavelength-selective device 255. In embodiments, a distance between each optical transceiver 219 and wavelength-selective device 215 is less than one meter. Similarly, a distance between each optical transceiver 259 and wavelength-selective device 255 may be less than one meter.

Herein optical link 240 refers to the following elements collectively: optical switch 211, optical coupler 251, a primary-path optical fiber 241 and a backup-path optical fiber 245. Herein, examples of wavelength-selective devices—such was wavelength-selective device 215, 255 and others disclosed herein—include optical multiplexers, optical demultiplexers, and wavelength-selective switches.

At network hub 210, multiple optical transceivers 219 are multiplexed together through wavelength-selective device 215. In this configuration, protection is provided over the major areas of concern, which include the protection of fiber portion from network hub 210 to aggregation node 250, and optical transceiver equipment at network hub 210 with separate optical blade with tunable optical transceiver(s) through optical coupler 213. Optical link 240 provides automatic switching capability through optical switch 211 at network hub 210 for 1:1 protection. The normal traffic signal is typically fed to primary-path optical fiber 241 and coupled into wavelength-selective device 255 at aggregation node 250. When primary-path optical fiber 241 fails, the normal traffic signal is transported on backup path optical fiber 245 through automatic protection switching at network hub 210.

Depending on the protection requirements, different types of optical switches (e.g., different switching means and speed) can be implemented so that minimum data will be lost in the event of a fiber link failure along optical link 240. Optical tap detectors can be used to constantly monitor optical power of the primary fiber. When optical power inside primary-path optical fiber 241 is below a user-defined threshold, optical switch 211 restores the communication and services by automatically switches the link to go through the backup-path optical fiber 245.

For the transceiver protection, one protection transceiver 217 protects multiple, say N, number of optical transceivers 219, which is called "1:N protection." An optical backplane connects optical transceiver 219 to protection transceiver 217. More protection transceivers, n in total, can be installed as well for n:N protection for higher protection ratio. This equipment redundancy architecture is suitable for the manual pre-configuration in the use case of network equipment maintenance. In this case, a spare TRx module or linecard is initially in the transceiver chassis or prior to system upgrade, this spare TRx module or linecard is optically coupled to optical coupler 213.

Depending optical power budget, one or more optical amplifiers 212 may be needed to boost the signal power before launching optical signals from optical coupler 213 to optical link 240. It is also noted that optical signals propagating in optical network section 202 may be analog signal, an intensity modulated direct detection signal, or coherent optical signals. In embodiments, at least one of wavelength-selective device 215 and wavelength-selective device 255 is a wavelength-selective switch for flexible wavelength switching capability at the network edge.

Figure 3:
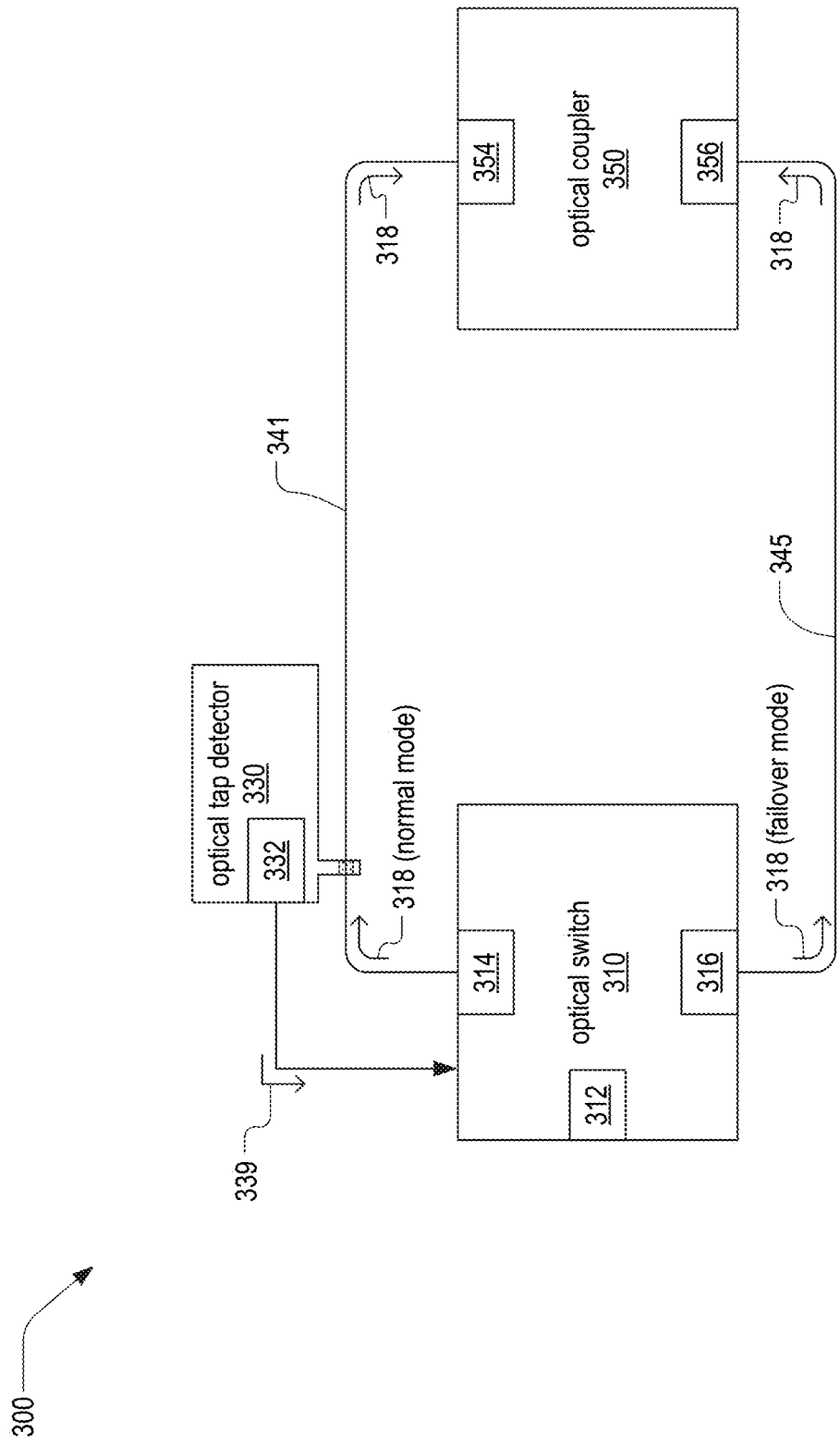
FIG. 3 is a schematic block diagram of an optical link redundancy architecture, in an embodiment.

FIG. 3 is a schematic block diagram of an optical link redundancy architecture 300. Redundancy architecture 300 includes an optical switch 310, an optical tap detector 330, and an optical coupler 350. Optical switch 310 includes a hub-side switch-port 312, a normal-mode switch-port 314, and a failover-mode switch-port 316. Optical switch 211 and optical coupler 251 are examples of optical switch 310 and optical coupler 350, respectively.

Optical coupler 350 includes a normal-mode coupler-port 354, a failover-mode coupler-port 356, and a local-side port 358. Normal-mode coupler-port 354 us optically coupled to normal-mode switch-port 314 via a primary-path optical fiber 341. Failover-mode coupler-port 356 optically coupled to the failover-mode switch-port 316 via a backup-path optical fiber 345. In embodiments, a length of each of the primary-path optical fiber and the backup-path optical fiber is between three kilometers and eighty kilometers. Optical fibers 241 and 245 are examples of optical fibers 341 and 345 respectively.

Optical tap detector 330 is optically coupled to primary-path optical fiber 341, (ii) includes a monitor port 332 communicatively coupled to optical switch 310, and (iii) outputs a tap signal 339 at monitor port 332 in response to an optical signal 318 propagating in primary-path optical fiber 341. In embodiments, tap signal 339 is, or is derived from, a photocurrent generated by the optical tap detector in response to detecting optical signal 318. In embodiments, optical tap detector 330 is located in, part of, and/or integrated with one of the optical switch 310 and the optical coupler 350.

In an example use scenario, optical switch 310 receives optical signal 318 at hub-side switch-port 312. In a default configuration, and/or when tap signal 339 exceeds a threshold value, optical switch 310 optically couples hub-side switch-port 312 to normal-mode switch-port 314 such that optical signal 318 propagates to optical coupler 350 via primary-path optical fiber 341 and normal-mode coupler-port 354. When tap signal 339 is less than the threshold value, optical switch 310 optically couples hub-side switch-port 312 to failover-mode switch-port 316, such that such that optical signal 318 propagates to optical coupler 350 via backup-path optical fiber 345 and failover-mode coupler-port 356.

Figure 4:
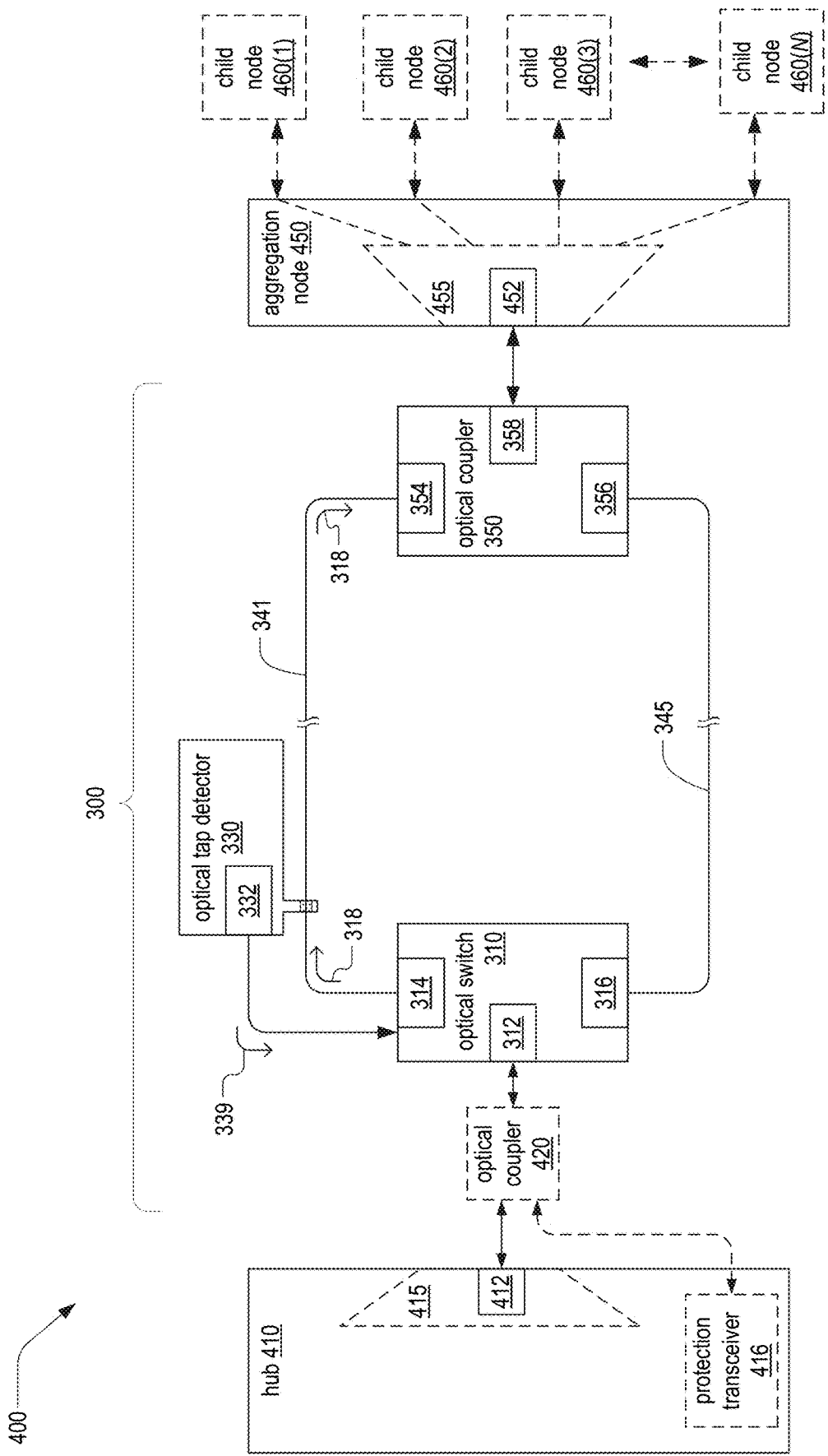
FIG. 4 is a schematic of an optical network, which includes the optical link architecture of FIG. 3, a network hub, and a network node, in an embodiment.

FIG. 4 is a schematic of an optical network 400, which includes optical link redundancy architecture 300, a network hub 410, and an aggregation node 450. Network hub 210 and aggregation node 250 are examples of network hub 410 and aggregation node 450 respectively. Network hub 410 includes a multiplexed port 412 optically coupled to hub-side switch-port 312. Aggregation node 450 includes a multiplexed port 452 optically coupled to a local-side port 358 of optical coupler 350.

In embodiments, optical network 400 also includes at least one of a protection transceiver 416, at least one child node 460, and an optical coupler 420. Optical coupler 213 is an example of optical coupler 420. In embodiments, both protection transceiver 416 and multiplexed port 412 are optically coupled to hub-side switch-port 312 via optical coupler 420.

In embodiments, network hub 410 includes at least one of (i) a wavelength-selective device 415 that includes multiplexed port 412, and (ii) protection transceiver 416 optically coupled to hub-side switch-port 312. In embodiments, aggregation node 450 includes a wavelength-selective device 455 that includes multiplexed port 452. Wavelength-selective devices 215 and 255 are respective examples of wavelength-selective devices 415 and 455 respectively.

In embodiments, optical network 400 is an access network that includes a plurality of child nodes 460(1-N), where N is a positive integer. Aggregation node 450 may be an aggregation node downstream from network hub 410 and upstream from child nodes 460, which are coupled to aggregation node 450 via optical links.

Figure 5:
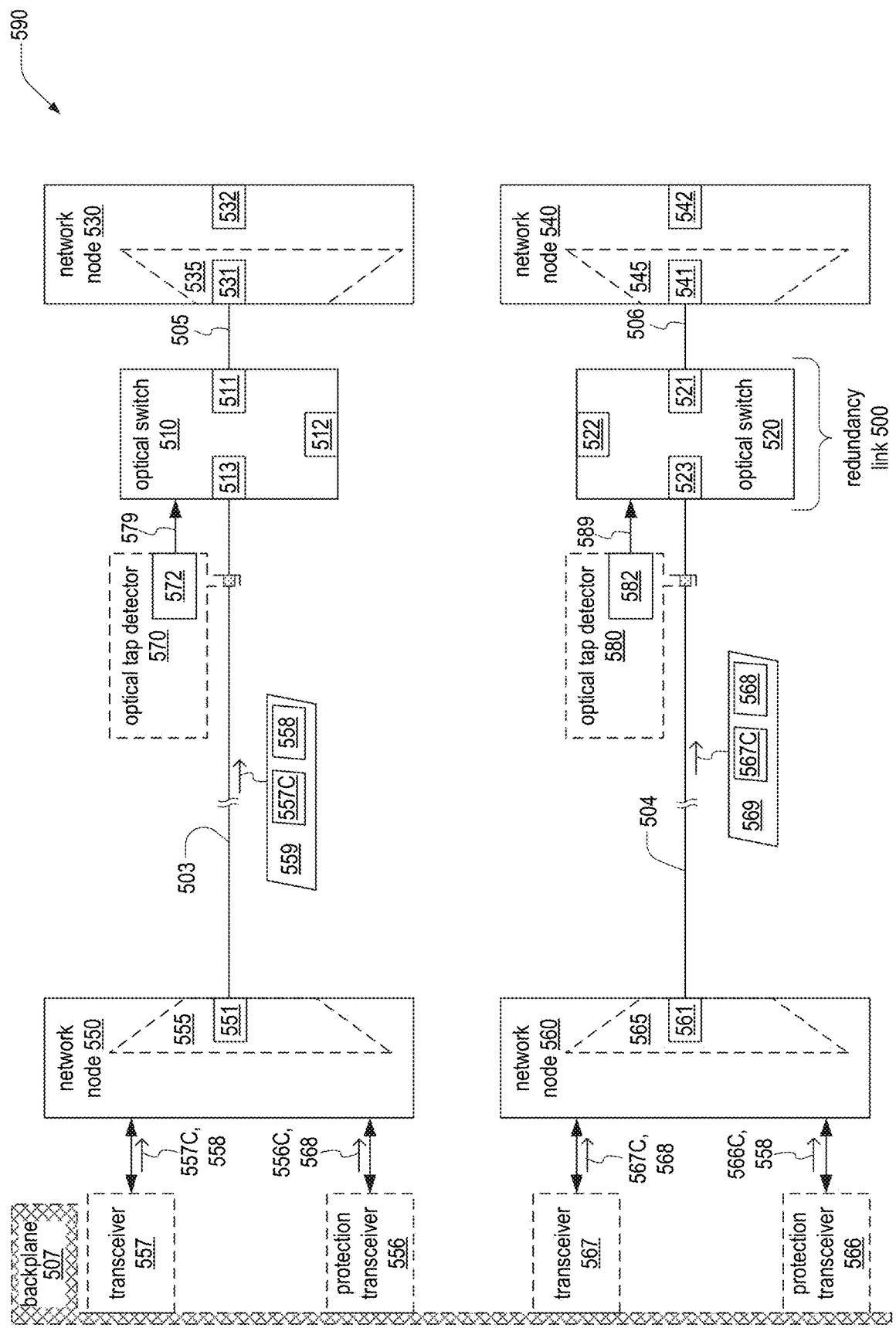
FIG. 5 is a schematic of a redundancy link in an example use scenario within an optical network, in an embodiment.
Figure 6:
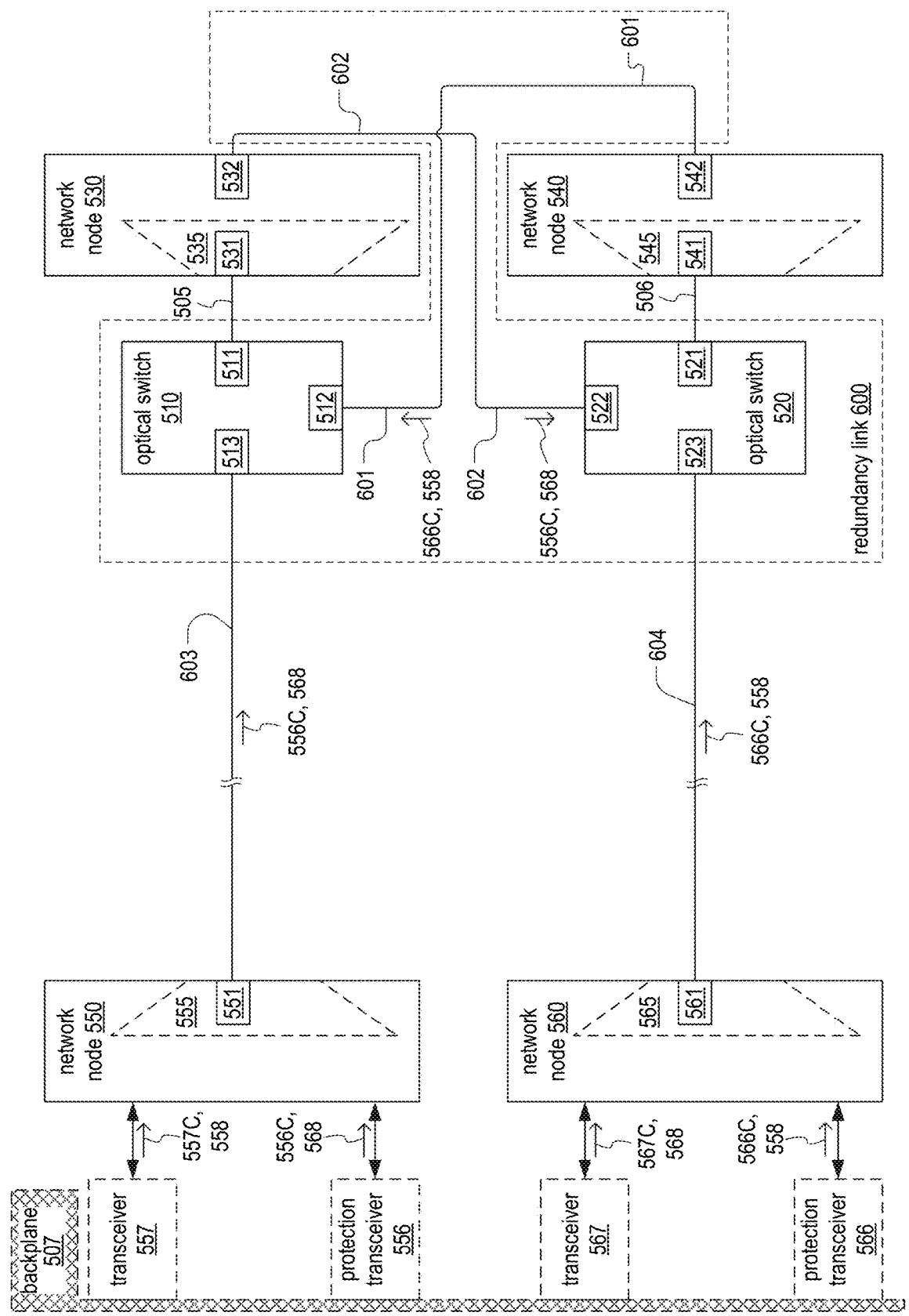
FIG. 6 is a schematic of a first redundancy link in an example use scenario within the optical network introduced in FIG. 5, in an embodiment.

As more fiber is laid out deeper in the network and distance between fiber end-points decreases, it becomes much easier to connect these optical endpoints and close the endpoint to achieve redundancy at the aggregation or fiber node level in the distributed access architecture. From a fiber connectivity topology perspective, fiber connections between adjacent optical aggregation nodes provides node-level redundancy. FIGS. 5-7 illustrate embodiments of such node-level redundancy.

FIG. 5 is a schematic of a redundancy link 500 in an example use scenario within an optical network 590. Optical network 590 includes redundancy link 500 and at least one of: network nodes 530-560, protection transceivers 556 and 566, transceivers 557 and 567, optical fibers 503, 504, 505, and 506. Protection transceiver 556 and transceiver 557 are optically coupled to network node 550. Protection transceiver 566 and transceiver 567 are optically coupled to network node 560. In embodiments, redundancy link 500 includes network nodes 530 and 540. In embodiments, each of optical fiber 503 and 504 is a single optical fiber and is part of a full-duplex optical link. In embodiments, each of optical fiber 503 and 504 is or includes an optical fiber pair.

Network nodes 530-560 include respective multiplexed ports 531, 541, 551, and 561. In embodiments, network nodes 530-560 include respective wavelength-selective devices 535, 545, 555, and 565, each of which may be a multiplexer, a demultiplexer, or a wavelength-selective switch. Multiplexed ports 531, 541, 551, and 561 may be respective ports of wavelength-selective devices 535, 545, 555, and 565.

In embodiments, network nodes 550 and 560 are in a same network hub, in which case an optical backplane 507 optically couples (i) transceiver 557 to protection transceiver 566 and (ii) transceiver 567 to protection transceiver 556. When network nodes 550 and 560 are in different network hubs, a client-layer device such as an Internet Protocol router, optically couples (i) transceiver 557 to protection transceiver 566 and (ii) transceiver 567 to protection transceiver 556. In embodiments, redundancy link 500 includes at least one of protection transceivers 556 and 566.

Redundancy link 500 includes an optical switch 510 and an optical switch 520. Optical switch 510 includes switch-ports 511-513. Switch-port 511 is optically coupled to a multiplexed port 531 of a network node 530. Switch-port 512 is optically coupled to a demultiplexed port 542 of a network node 540. Switch-port 513 is optically coupled to a multiplexed port 551 of a network node 550 via an optical fiber 503.

Optical switch 520 includes a switch-ports 521-523. Switch-port 521 is optically coupled to a multiplexed port 541 of network node 540. Switch-port 522 is optically coupled to a demultiplexed port 532 of network node 530. Switch-port 523 is optically coupled to a multiplexed port 561 of a network node 560 via an optical fiber 504.

In a first example use scenario, transceiver 557 transmits a modulated signal 559 to multiplexed port 531 of network node 530 via network node 550 and optical fiber 503, optical switch 510, and optical fiber 505. Modulated signal 559 includes baseband signal 558 modulated by a carrier wavelength 557C. In this instance, optical switch 510 is configured to connect switch-ports 513 and 511.

In a second example use scenario, transceiver 567 transmits a modulated signal 569 to multiplexed port 541 of network node 540 via network node 560, optical fiber 504, optical switch 520, and optical fiber 506. Modulated signal 569 includes a baseband signal 568 modulated by a carrier wavelength 567C. In this instance, optical switch 520 is configured to connect switch-ports 521 and 523.

In embodiments, optical network 590 includes optical tap detectors 570 and 580, each of which may be part of redundancy link 500. Optical tap detector 570 (i) is optically coupled to the optical fiber 503 and (ii) includes a monitor port 572 communicatively coupled to optical switch 510, and (iii) outputs a tap signal 579 to monitor port 572 in response to modulated signal 559 propagating in optical fiber 503. Optical switch 510 is configured to optically couple switch-port 512 to the switch-port 511 when tap signal 579 is less than a threshold value.

Optical tap detector 580 (i) is optically coupled to the optical fiber 504 and (ii) includes a monitor port 582 communicatively coupled to optical switch 520, and (iii) outputs a tap signal 589 to monitor port 582 in response to modulated signal 569 propagating in optical fiber 504. Optical switch 520 is configured to optically couple switch-port 522 to the switch-port 521 when tap signal 589 is less than a threshold value.

FIGS. 6 and 7 present two schemes to achieve redundancy between aggregation nodes of an optical network. In the proposed architecture, 1+1 protection can be achieved to both aggregation node connections for both optical transceiver equipment and transmission fiber portion.

FIG. 6 is a schematic of a redundancy link 600 in an example use scenario within optical network 590, FIG. 5. Redundancy link 600 is an example of redundancy link 500 and includes optical fibers 603, 604, and at least one of optical fibers 601 and 602. Optical fiber 601 optically couples switch-port 512 to demultiplexed port 542. Optical fiber 602 optically couples switch-port 522 to demultiplexed port 532. Optical fibers 603 and 604 are respective examples of optical fibers 503 and 504. In embodiments, each of optical fibers 603 and 604 is, or includes, an optical fiber pair.

When the optical fiber 603 is broken, protection transceiver 566 receives baseband signal 558 from optical backplane 507 and transmits baseband signal 558, modulated by a carrier wavelength 566C, to multiplexed port 531 of network node 530 via a path that traverses, in chronological order: network node 560, optical fiber 604, switch-port 533, switch-port 521, network node 540 (ports 541 and 542), optical fiber 601, switch-port 512, switch-port 511, and optical fiber 505. In this instance, optical switch 520 is configured to connect switch-ports 523 and 521, and optical switch 510 is configured to connect switch-ports 512 and 511. In embodiments, carrier wavelength 566C differs from carrier wavelength 557C. Baseband signal 558, modulated by either carrier wavelengths 557C or 566C, may be an analog signal, IM-DD, or a coherent optical signal.

When the optical fiber 604 is broken, protection transceiver 556 receives baseband signal 568 from optical backplane 507 and transmits baseband signal 558, modulated by a carrier wavelength 556C, to multiplexed port 541 of network node 540 via a path that traverses, in chronological order: network node 550, optical fiber 603, and switch-port 513, switch-port 511, network node 530 (ports 531 and 532), optical fiber 602, switch-port 522, switch-port 521, and optical fiber 506. In this instance, optical switch 520 is configured to connect switch-ports 521 and 523, and optical switch 510 is configured to connect switch-ports 513 and 511. In embodiments, carrier wavelength 556C differs from carrier wavelength 567C. Baseband signal 558, modulated by either carrier wavelengths 556C or 567C, may be an analog signal, IM-DD, or a coherent optical signal.

FIG. 7 is a schematic of a redundancy link 700 in an example use scenario within the optical network introduced in FIG. 5. Redundancy link 700 is an example of redundancy link 500 and includes at least one of optical circulators 710 and 720. Optical circulator 710 has (i) a circulator port 711 optically coupled to demultiplexed port 532, (ii) a circulator port 712, and (iii) a circulator port 723 optically coupled to the switch-port 512. Optical circulator 720 has (i) a circulator port 721 optically coupled to demultiplexed port 542, (ii) a circulator port 722 optically coupled to circulator port 712 of the first optical circulator, and (iii) a circulator port 723 optically coupled to switch-port 522.

In embodiments, redundancy link 700 includes at least one of optical fibers 701-707. Optical fibers 703 and 704 are respective examples of optical fibers 503 and 504. Optical fiber 701 optically couples circulator port 711 to demultiplexed port 532. Optical fiber 702 optically couples circulator port 723 to switch-port 522. Optical fiber 706 optically couples circulator port 713 to switch-port 512. Optical fiber 706 optically couples circulator port 723 to switch-port 522. Optical fiber 707 optically couples circulator port 712 to circulator port 722.

When the optical fiber 503 is broken, protection transceiver 566 receives baseband signal 558 from optical backplane 507 and transmits baseband signal 558, modulated by a carrier wavelength 566C, to multiplexed port 531 of network node 530 via a path that traverses, in chronological order: network node 560, optical fiber 504, optical switch 520, network node 540 (ports 541 and 542), optical fiber 701, circulator port 721, circulator port 722, circulator port 712, circulator port 713, switch-port 512, switch-port 511, and optical fiber 505. In this instance, optical switch 520 is configured to connect switch-ports 523 and 521, and optical switch 510 is configured to connect switch-ports 512 and 511.

When the optical fiber 504 is broken, protection transceiver 556 receives baseband signal 568 from optical backplane 507 and transmits baseband signal 568, modulated by a carrier wavelength 556C, to multiplexed port 541 of network node 540 via a path that traverses, in chronological order: network node 550, optical fiber 503, optical switch 510, network node 530 (ports 531 and 532), optical fiber 706, circulator port 711, circulator port 712, circulator port 722, circulator port 723, switch-port 522, switch-port 521, and optical fiber 506. In this instance, optical switch 520 is configured to connect switch-ports 521 and 523, and optical switch 510 is configured to connect switch-ports 511 and 512.

Combinations of Features

Features described above as well as those claimed below may be combined in various ways without departing from the scope hereof. The following enumerated examples illustrate some possible, non-limiting combinations.

(A1) An optical link redundancy architecture includes an optical switch, an optical coupler, and an optical tap detector. The optical switch including a hub-side switch-port, a normal-mode switch-port, and a failover-mode switch-port. The optical coupler includes (i) a normal-mode coupler-port optically coupled to the normal-mode switch-port via a primary-path optical fiber, and (ii) a failover-mode coupler-port optically coupled to the failover-mode switch-port via a backup-path optical fiber. The optical tap detector (i) is optically coupled to the primary-path optical fiber, (ii) includes a monitor port communicatively coupled to the optical switch, and (iii) outputs a tap signal at the monitor port in response to an optical signal propagating in the primary-path optical fiber. The optical switch optically couples the hub-side switch-port to the failover-mode switch-port when the tap signal is less than a threshold value.

(A2) In embodiments of optical link redundancy architecture (A1), a length of each of the primary-path optical fiber and the backup-path optical fiber is between three kilometers and eighty kilometers.

(A3) In embodiments of either of optical link redundancy architectures (A1) or (A2), the optical switch optically couples the hub-side switch-port to the normal-mode switch-port when the tap signal exceeds the threshold value.

(A4) In embodiments of any of one of optical link redundancy architectures (A1)-(A3), the tap signal is a photocurrent generated by the optical tap detector.

(A5) In embodiments of any one of optical link redundancy architectures (A1)-(A4), the optical tap detector is located in one of the optical switch and the optical coupler.

(A6) An optical network includes any of optical link redundancy architectures (A1)-(A5), a network hub including a first multiplexed port optically coupled to the hub-side switch-port; and a network node including a second multiplexed port optically coupled to a local-side port of the optical coupler.

(A7) Embodiments of optical network (A6) include a multiplexer including the multiplexed port; and a protection transceiver optically coupled to the hub-side switch-port.

(A8) In embodiments of either one of optical networks (A6) and (A7), the network hub and the network node being part of a same access network.

(A9) In embodiments of any one of optical networks (A6)-(A8), the network node is an aggregation node downstream from the network hub and upstream from a plurality of child nodes of the access network.

(B1) A redundancy link includes a first optical switch and a second optical switch. The first optical switch includes a switch-port A1 optically coupled to a multiplexed port M1 of a first network node, a switch-port A2 optically coupled to a demultiplexed port D2 of a second network node, and a switch-port A3 optically coupled to a multiplexed port M3 of a third network node via a first optical fiber. The second optical switch includes a switch-port B1 optically coupled to a multiplexed port M2 of the second network node, a switch-port B2 optically coupled to a demultiplexed port D1 of the first network node, and a switch-port B3 optically coupled to a multiplexed port M4 of a fourth network node via a second optical fiber.

(B2) Embodiments of redundancy link (B1) further include at least one of a first optical fiber optically coupling the switch-port A2 to the demultiplexed port D2; and a second optical fiber optically coupling the switch-port B2 to the demultiplexed port D1.

(B3) Embodiments of either one of redundancy links (B1) and (B2) further include at least one of a first optical circulator and a second optical circulator. The first optical circulator has (i) a first port optically coupled to the demultiplexed port D1, (ii) a second port, and (iii) a third port optically coupled to the switch-port A2. The second optical circulator has (i) a fourth port optically coupled to the demultiplexed port D2, (ii) a fifth port optically coupled to the second port of the first optical circulator, and (iii) a sixth port optically coupled to the switch-port B2.

(B4) An optical network includes any one of redundancy link (B1)-(B3), the first network node, and the second network node.

(B5) Embodiments of optical network (B4) further includes at least one of (a) a first optical fiber optically coupling the switch-port A2 to the demultiplexed port D2; and (b) a second optical fiber optically coupling the switch-port B2 to the demultiplexed port D1. The first network node includes one of (i) a demultiplexer and (ii) a wavelength-selective switch, multiplexed port M1 and demultiplexed port D1 being respective ports thereof. The second network node includes one of (i) a demultiplexer and (ii) a wavelength-selective switch, multiplexed port M2 and demultiplexed port D2 being respective ports thereof.

(B6) Embodiments of optical network (B5) further include the third network node, a fourth network node, a transceiver T3, and a protection transceiver P4. Such embodiments may also include a transceiver T4 and a protection transceiver P3. A first distance between the first and the second network nodes is less than a second distance between the third and the fourth network nodes. Transceiver T3 is optically coupled to the switch-port A3 via the third network node and the first optical fiber. Protection transceiver P4 is communicatively coupled to the transceiver T3 and optically coupled to the switch-port B3 via the fourth network node and the second optical fiber. In embodiments, transceiver T4 is optically coupled to the switch-port B3 via the fourth network node and the second optical fiber. In embodiments, protection transceiver P3 is communicatively coupled to the transceiver T4 and optically coupled to the switch-port A3 via the third network node and the first optical fiber.

(B7) Embodiments of either one of optical networks (B5) and (B6) further include a first optical tap detector and a second optical tap detector. The first optical tap detector (i) is optically coupled to the first optical fiber, (ii) includes a first monitor port communicatively coupled to the first optical switch, and (iii) outputs a first tap signal to the first monitor port in response to a first optical signal propagating in the first optical fiber. The second optical tap detector (i) is optically coupled to the second optical fiber, (ii) includes a second monitor port communicatively coupled to the second optical switch, and (iii) outputs a second tap signal to the second monitor port in response to a first optical signal propagating in the second optical fiber. The first optical switch is configured to optically couple the switch-port A2 to the switch-port A1 when the first tap signal is less than a first threshold value. The second optical switch is configured to optically couple the switch-port B2 to the switch-port B1 when the second tap signal is less than a second threshold value.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A redundancy link comprising:
a first optical switch including a switch-port A1 optically coupled to a multiplexed port M1 of a first network node, a switch-port A2 optically coupled to a demultiplexed port D2 of a second network node, and a switch-port A3 optically coupled to a multiplexed port M3 of a third network node via a first optical fiber; and
a second optical switch including a switch-port B1 optically coupled to a multiplexed port M2 of the second network node, a switch-port B2 optically coupled to a demultiplexed port D1 of the first network node, and a switch-port B3 optically coupled to a multiplexed port M4 of a fourth network node via a second optical fiber.

2. The redundancy link of claim 1, further comprising a third optical fiber optically coupling the switch-port A2 to the demultiplexed port D2.

3. The redundancy link of claim 2, further comprising a fourth optical fiber optically coupling the switch-port B2 to the demultiplexed port D1.

4. The redundancy link of claim 1, further comprising a first optical circulator having (i) a first port optically coupled to the demultiplexed port D1, (ii) a second port, and (iii) a third port optically coupled to the switch-port A2.

5. The redundancy link of claim 4, further comprising a second optical circulator having (i) a fourth port optically coupled to the demultiplexed port D2, (ii) a fifth port optically coupled to the second port of the first optical circulator, and (iii) a sixth port optically coupled to the switch-port B2.

6. An optical network comprising: the redundancy link of claim 1, the first network node, and the second network node.

7. The optical network of claim 6, further comprising:
a third optical fiber optically coupling the switch-port A2 to the demultiplexed port D2;
wherein the second network node includes one of (i) a demultiplexer and (ii) a wavelength-selective switch, multiplexed port M2 and demultiplexed port D2 being respective ports thereof.

8. The optical network of claim 7, further comprising:
a fourth optical fiber optically coupling the switch-port B2 to the demultiplexed port D1;
wherein the first network node includes one of (i) a demultiplexer and (ii) a wavelength-selective switch, multiplexed port M1 and demultiplexed port D1 being respective ports thereof.

9. The optical network of claim 8, further comprising:
the third network node;
the fourth network node, a first distance between the first and the second network nodes being less than a second distance between the third and the fourth network nodes;
a transceiver T3 optically coupled to the switch-port A3 via the third network node and the first optical fiber; and
a protection transceiver P4 communicatively coupled to the transceiver T3 and optically coupled to the switch-port B3 via the fourth network node and the second optical fiber.

10. The optical network of claim 8, further comprising:
a transceiver T4 optically coupled to the switch-port B3 via the fourth network node and the second optical fiber; and
a protection transceiver P3 communicatively coupled to the transceiver T4 and optically coupled to the switch-port A3 via the third network node and the first optical fiber.

11. The optical network of claim 7, further comprising:
a first optical tap detector that (i) is optically coupled to the first optical fiber, (ii) includes a first monitor port communicatively coupled to the first optical switch, and (iii) outputs a first tap signal to the first monitor port in response to a first optical signal propagating in the first optical fiber; and
a second optical tap detector that (i) is optically coupled to the second optical fiber, (ii) includes a second monitor port communicatively coupled to the second optical switch, and (iii) outputs a second tap signal to the second monitor port in response to a first optical signal propagating in the second optical fiber;
the first optical switch being configured to optically couple the switch-port A2 to the switch-port A1 when the first tap signal is less than a first threshold value;
the second optical switch being configured to optically couple the switch-port B2 to the switch-port B1 when the second tap signal is less than a second threshold value.

\* \* \* \* \*